(12) United States Patent
Shirashima et al.

(10) Patent No.: US 6,327,239 B1
(45) Date of Patent: Dec. 4, 2001

(54) DISC APPARATUS

(75) Inventors: Hitoshi Shirashima; Shoji Suzuki, both of Iwaki (JP)

(73) Assignee: Alpine Electronics, Inc. (JP)

( * ) Notice: Subject to any disclaimer, the term of this patent is extended or adjusted under 35 U.S.C. 154(b) by 0 days.

(21) Appl. No.: 09/429,500

(22) Filed: Oct. 27, 1999

(30) Foreign Application Priority Data

Nov. 13, 1998 (JP) .................................................. 10-323273

(51) Int. Cl.$^7$ ............................ G11B 17/04; G11B 17/08
(52) U.S. Cl. ............................................................ 369/192
(58) Field of Search ....................................... 369/192, 191, 369/178, 176, 75.2, 30, 36; 360/98.04

(56) References Cited

U.S. PATENT DOCUMENTS

| | | | |
|---|---|---|---|
| 5,574,705 | 11/1996 | Suzuki | .................................... 369/36 |
| 5,854,784 | * 12/1998 | Tamiya et al. | ........................ 369/192 |
| 6,041,032 | * 3/2000 | Ishida et al. | ............................ 369/191 |

* cited by examiner

*Primary Examiner*—Robert S. Tupper
*Assistant Examiner*—Julie Anne Watko
(74) *Attorney, Agent, or Firm*—Brinks Hofer Gilson & Lione

(57) ABSTRACT

In a disc apparatus of the type in which a tray is moved to a drawn-out position and a disc on the tray is loaded onto a turntable of a disc driving section and then the tray is returned to an accommodated position, a cam gear is rotated counterclockwise and clockwise by the drive force of a motor. Movement force is imparted to constraining drive portions of a cam by a slide shaft. A transfer member is reciprocated by a driving member to draw out the tray and clamp the disc, and then the tray is returned to the magazine. By reciprocating the tray by continuous rotation of the cam gear, the tray can be moved with an accurate stroke.

20 Claims, 10 Drawing Sheets

DISC APPARATUS

BACKGROUND OF THE INVENTION

1. Field of the Invention

The present invention relates to a disc apparatus which extracts a tray from a tray accommodating section such as a magazine and attaches a disc on this tray to a disc drive section.

2. Description of the Related Art

FIGS. 10A and 10B are side views showing the operation of a conventional disc apparatus.

In this disc apparatus, a plurality of trays T are provided in a magazine M loaded in the apparatus so as to be capable of being drawn out, and a disc D is placed on each tray T. A disc drive section 1 opposed to the loading position of the magazine M is provided with a drive chassis 2 and a clamp arm 5 rotatably supported by the drive chassis 2 through the intermediation of a shaft 7.

The drive chassis 2 carries a turntable 3, a spindle motor 4 for turning the turntable 3, and an optical head. A clamper 6 is rotatably supported by the clamp arm 5.

In this disc apparatus, one of the trays T in the magazine M is selected through vertical movement as seen in the drawing of the disc drive section 1. As shown in FIG. 10A, in the condition in which the disc drive section 1 is at rest at a position where it has selected a tray, the clamp arm 5 rotates upward and the clamper 6 is separated from the turntable 3. In this condition, the tray T selected from the magazine M is drawn out toward the disc drive section 1. When the tray T is drawn out and the center of the disc D on the tray T is matched with the turntable 3, the clamp arm 5 rotates downward, and the central portion of the disc D is clamped by the clamper 6 and the turntable 3. After this, as shown in FIG. 10B, the tray T is returned to the magazine M, and the disc D is driven by the spindle motor 4, whereby information recorded fin on the disc D is read by the optical head.

When the driving of the disc D has been completed, the empty tray T is drawn out over the disc drive section 1 again, and, when the tray T reaches a position under the disc D, the clamp arm 5 is raised and the clamper 6 is separated from the disc D, and the clamping of the disc D is canceled, the free disc D being placed on the tray T. Then, the tray T is returned to the magazine M with the disc D.

When constructing the disc apparatus as shown in FIGS. 10(A) and 10(B), however, the following problems are involved.

(1) In the operation of drawing out the tray T accommodated in the magazine M toward the disc drive section 1, a tray transfer member engaged with the tray T is moved in the drawing direction by using the power of a motor or the like. When, as shown in FIG. 10B, the tray T is drawn out and the central portion of the disc D on the tray T is matched with the turntable 3, it is necessary to detect the drawn-out position of the tray T and stop the operation of drawing out the tray T. When it is detected that the tray T has been drawn out through a predetermined distance, the clamp arm 5 is lowered, and then the tray T is returned to the magazine M.

In this system, it is necessary to provide a detecting means such as a switch for detecting that the tray T has been drawn out through a predetermined distance from the magazine, so that the number of parts is rather large. Further, it is necessary to control the starting and stopping of the motor for operating the tray transfer member in relationship with the detection output, so that the control on the electronic circuit is complicated.

Furthermore, due to positional deviation of the detecting means, deviation in the detection timing of the detecting means such as a switch, etc., there is a possibility of positional deviation occurring in the position at which the drawing of the tray T out of the magazine M is completed. When such positional deviation occurs, the positioning of the center of the disc D on the turntable 3 cannot be correctly effected, and there is a danger of deficient clamping occurring.

(2) Conventionally, a driving means for raising and lowering the clamp arm 5 has been provided separately from the driving means for drawing out the tray T, so that the number of driving sources such as motors is rather large, making it difficult to achieve a reduction in the size of the apparatus. Further, it is difficult to set the timing between the completion of the operation of drawing out the tray T and the lowering of the clamp arm 5, with the result that it is necessary to perform a fine adjusting operation in the production process, resulting in an increase in production man-hours.

(3) In the case of an in-car apparatus, the disc driving section 1 is supported by an elastic support member such as an oil damper or a spring so that the influence of the vibration of the vehicle may be lessened. However, when, as shown in FIG. 10A, the tray T is drawn out, it is necessary to lock the disc driving section 1 in order to match the center of the disc D with the turntable 3. When this locking is effected by using still another drive source, the number of drive source is increased. Further, the setting of the operation timing is complicated.

(4) The operation of drawing the tray T out of the magazine M is made possible by engaging a hook with the tray T and drawing out the tray T with the hook. However, when drawing out the tray T with the hook, the tray T is subject to vertical play. In view of this, it has conventionally been necessary to provide guide members for guiding both sides of the tray T, resulting in a complicated construction.

BRIEF SUMMARY OF THE INVENTION

The present invention has been made with a view toward solving the above problems in the prior art. It is an object of the present invention to provide a disc apparatus in which the operation of reciprocating the tray between the accommodated position and the drawn-out position can be performed as a series of operations to make it unnecessary to effect detection when drawing out the tray and in which the position where the operation of drawing out the tray is completed can be correctly set.

Another object of the present invention is to provide a disc apparatus in which the operation of drawing out the tray and the operation of the clamping means and locking means can be effected by the same drive source to thereby simplify the construction of the apparatus, and which is capable of setting the operation timing with high accuracy.

Still another object of the present invention is to provide a disc apparatus which can prevent vertical play of the tray when drawing out the tray to thereby make it possible to eliminate at least the guide member for guiding one side of the tray.

In accordance with the present invention, there is provided a disc apparatus to be used with a disc, the disc apparatus comprising:

a disc driving section, the disc driving section comprising:

a turntable for rotating a disc, and a head for recording information on and reproducing information from the rotating disc;

a tray, the tray for carrying a disc;

tray transferring means, the tray transferring means for reciprocating the tray between an accommodated position, at which the tray is spaced apart from the turntable, and a drawn-out position, at which the center of a disc carried by the tray is matched with the turntable;

transfer drive means, the transfer drive means for reciprocating the tray transferring means; and clamp means, the clamp means for clamping the center of a disc to the turntable when the tray is moved from the accommodated position to the drawn-out position, and for canceling the clamping of a disc when the empty tray is moved from the accommodated position to the drawn-out position to enable a disc to return to the accommodated position with the tray, wherein the transfer drive means comprises:

a motor;

a rotary member rotated by the motor, the rotation occurring continuously in one direction; and converting means, the converting means for converting the rotation of the rotary member into a reciprocating movement to cause the tray transferring means to reciprocate.

In the present invention, in the transfer drive means, the continuous rotation of the rotary member driven by the motor is converted to a reciprocating movement to reciprocate the tray transfer means, so that the tray is moved from the accommodated position to the drawn-out position by the continuous rotation of the rotary member, and then restored to the accommodated position also by the continuous rotation of the rotary member, whereby there is no need to detect the protruding position of the tray and stop the motor. Further, since the protruding position of the tray is determined by the mechanical accuracy of the converting means, the protruding position of the tray can be set accurately.

Preferably, in the transfer drive means, the rotary member is continuously rotated in a first direction and in a second direction opposite thereto by normal and reverse rotation of the motor, wherein the tray transferring means is reciprocated by the converting means both while the rotary member is continuously rotated in the first direction and while it is continuously rotated in the second direction.

In this case, normal rotation and reverse rotation of the motor are alternately effected to thereby rotate the rotary member in the first direction and the second direction. The tray is reciprocated between the accommodated position and the drawn-out position by the rotations in the first direction and the second direction. In this construction, a stopper is provided so that the rotary member may be rotated by a predetermined angle in the first direction and the second direction when drawing out the tray, whereby the amount of rotation of the rotary member can be correctly determined. Through rotation by the predetermined angle, it is possible to cause the tray to protrude by a predetermined distance toward the drawn-out position.

However, it is also possible for the rotary member to rotate in only one direction, the tray being moved from the accommodated position to the drawn-out position and then to the accommodated position through each rotation.

Further, in the present invention, when the rotary member rotates in the first direction and the tray carrying the disc is moved to the drawn-out position by the tray transferring means, the central portion of the disc is clamped to the turntable by the clamp means. When the rotary member is rotated in the second direction and the tray is moved to the drawn-out position by the tray transferring means, the clamp of the disc is canceled by the clamp means.

Alternatively, there may be provided an elastic support member for elastically supporting the disc driving section, wherein there is provided lock means. Using the lock means, when the rotary member rotates in the first direction and the tray carrying the disc is moved to the drawn-out position, the disc driving section is switched from the locked state to the unlocked state after the disc center is clamped to the turntable by the clamp means, and, when the rotary member rotates in the second direction and the tray is moved to the drawn-out position, the disc driving section is switched from the unlocked state to the locked state before the clamp of the disc is canceled by the clamp means.

Further, in the converting means provided in the transfer drive means, it is possible to provide a play region which allows the rotary member to rotate in the first direction and the second direction without returning the tray transferring means in the tray accommodating direction when the tray transferring means has moved to the tray drawn-out position, wherein the clamp means, or the lock means, or both the clamp means and the lock means can be operated by the rotating force of the rotary member in the play region.

In this way, by effecting clamping operation and/or locking operation by utilizing the torque of the rotary member after the tray has moved to the drawn-out position, there is no need to provide a separate drive source for driving the clamp means and the lock means. Further, the timing of the operations of drawing out the tray, clamping, and locking can be set with high accuracy.

For example, the converting means includes a drive member for reciprocating the tray transferring means. One of the rotary member and the drive member is provided with a cam, and the other of the rotary member and the drive member is provided with a follower sliding on the cam. The cam is provided with: (a) a drive constraining portion, which constrains the follower during the rotation of the rotary member and causes the tray transferring means to reciprocate through the intermediation of the drive member, and (b) the play region where the follower slides, the clamp means or the lock means or both the clamp means and the lock means being driven by the torque of the rotary member when the follower is sliding in the play region.

In this case, there may be provided a switching member which is reciprocated by the torque of the rotary member when the follower is sliding in the play region. The switching member comprises both the clamp means and the lock means. The switching member reciprocates through a continuous rotation in the first direction and a continuous rotation in the second direction of the rotary member. When the reciprocating range of the switching member is determined in advance, the limit point in the reciprocating movement of the switching member functions as a stopper for determining the angle of the rotation in the first direction and the angle of rotation in the second direction of the rotary member. In this way, there is no need to separately provide a stopper for restricting the rotation angle of the rotary member.

Further, the tray transferring means is preferably provided with a hook which is engaged so that the tray may be constrained from above and below and moved between the accommodated position and the drawn-out position with respect to the tray. By using the hook, no vertical play is generated in the transferred tray, and there is no need to provide a guide member for guiding the tray at least on the side where the hook is provided.

The present invention, as described above, is suitable for a disc apparatus in which a plurality of trays are provided in a magazine so as to be capable of being drawn out, and in which the tray to be transferred is selected by moving the disc driving section and tray transferring means in the direction in which the trays are arranged.

The present invention is also applicable to a disc apparatus in which no magazine is loaded, but in which a plurality of trays are directly provided in the casing so as to be capable of being drawn out, a disc being mounted on each tray from outside. It is also applicable to an apparatus in which only one tray is provided.

DETAILED DESCRIPTION OF THE INVENTION

Figure 1:
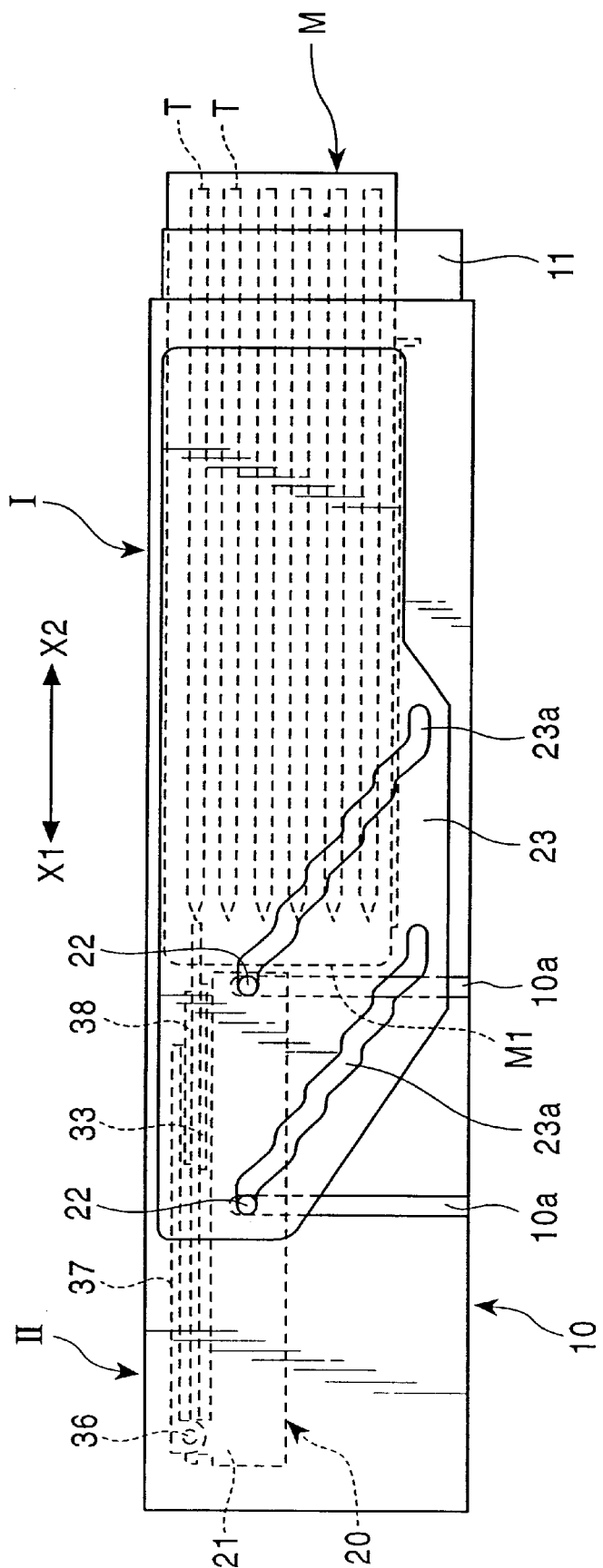
FIG. 1 is a side view of a disc apparatus according to an embodiment of the present invention.
Figure 2:
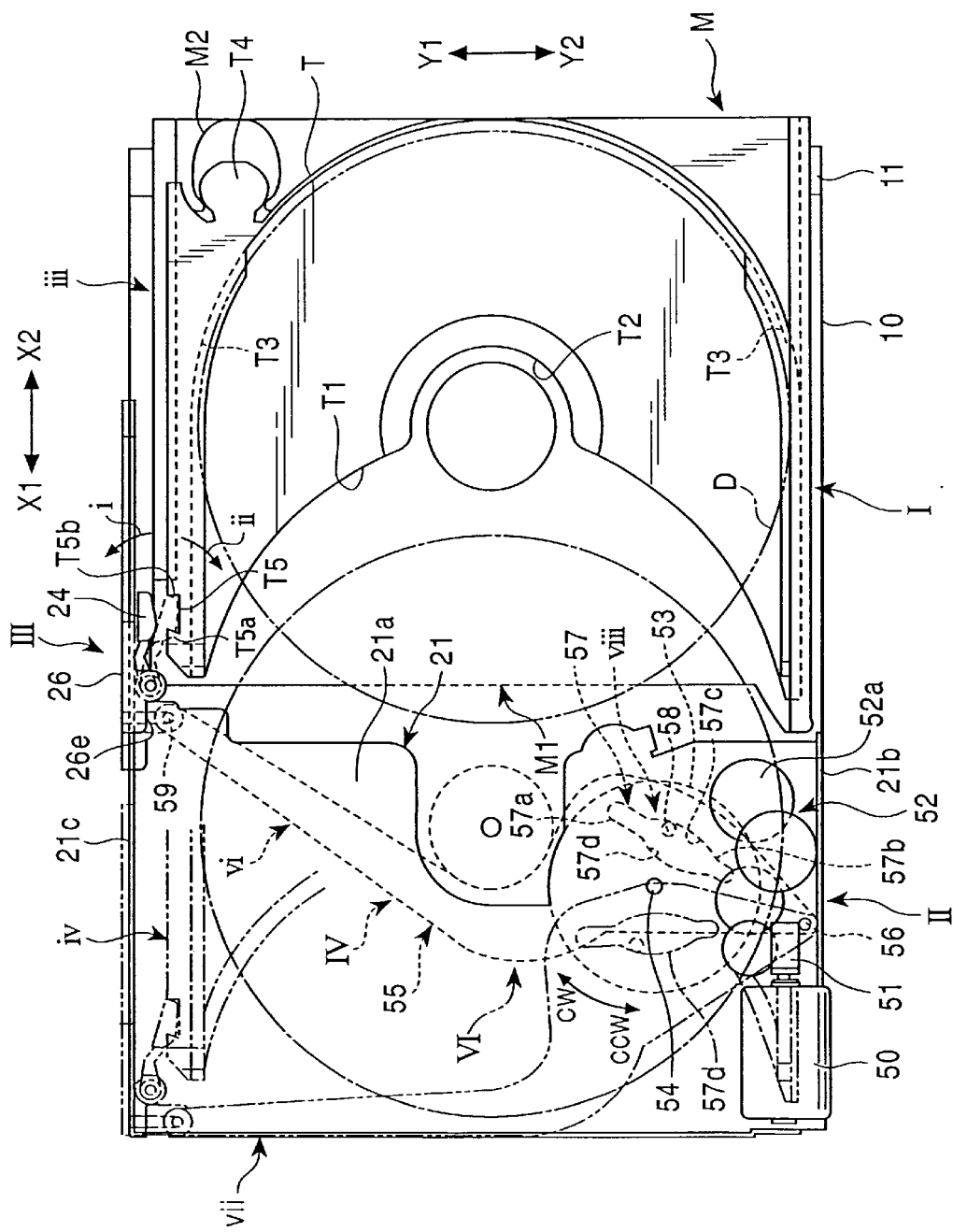
FIG. 2 is a plan sectional view of the disc apparatus.
Figure 3:
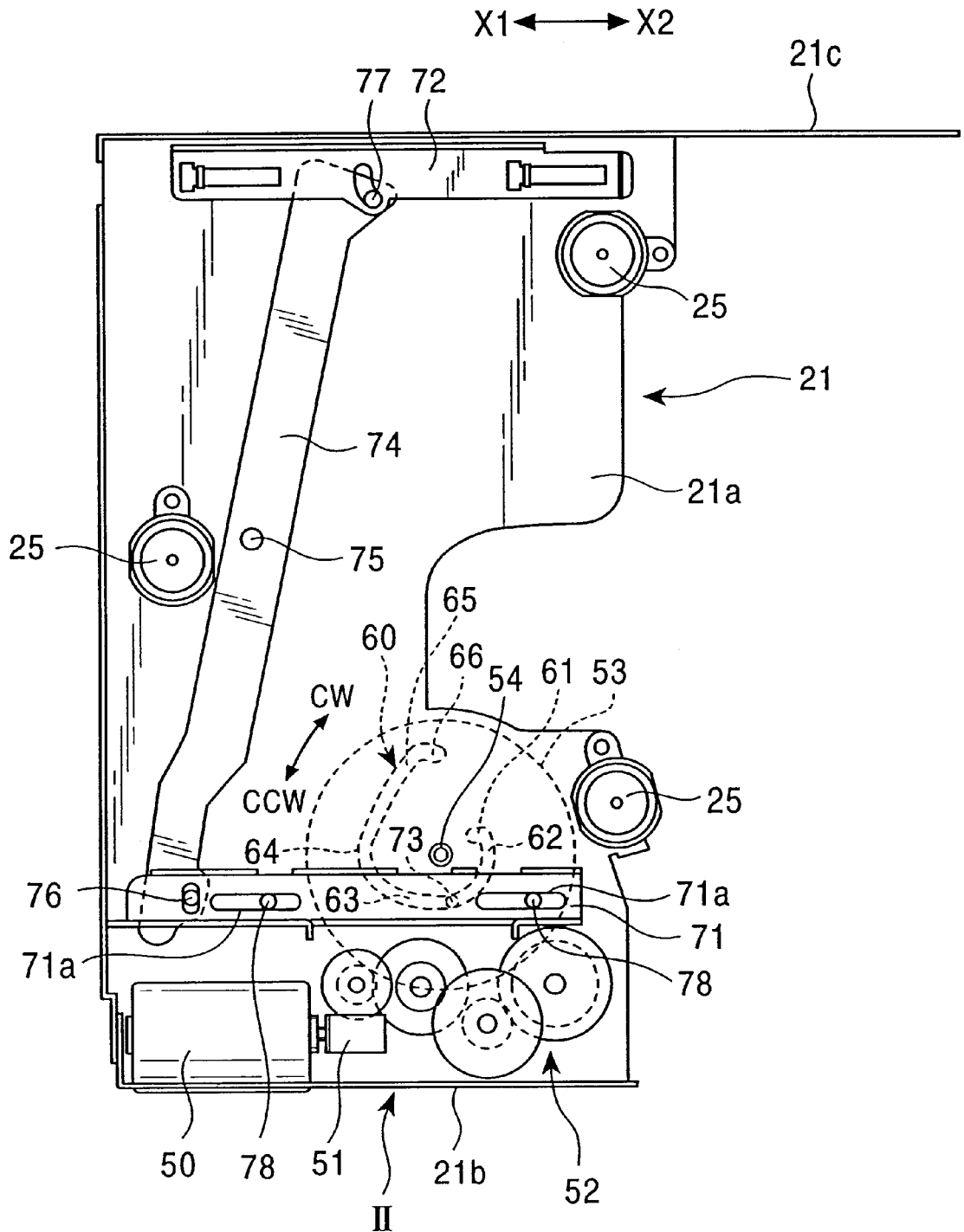
FIG. 3 is a plan view showing an ascent/descent unit in the disc apparatus.
Figure 4:
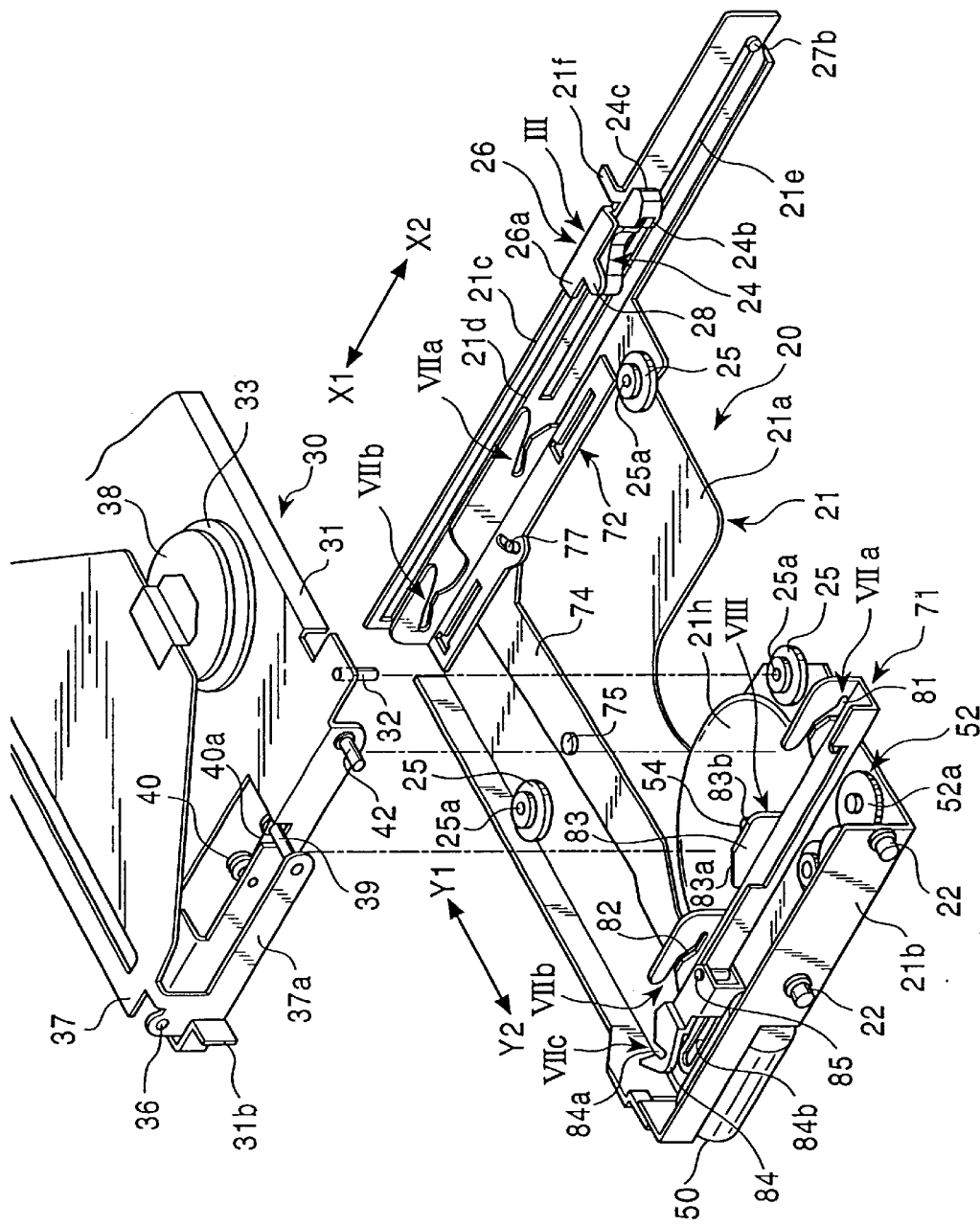
FIG. 4 is an exploded perspective view showing the ascent/descent unit and a disc driving section mounted thereon.
Figure 5:
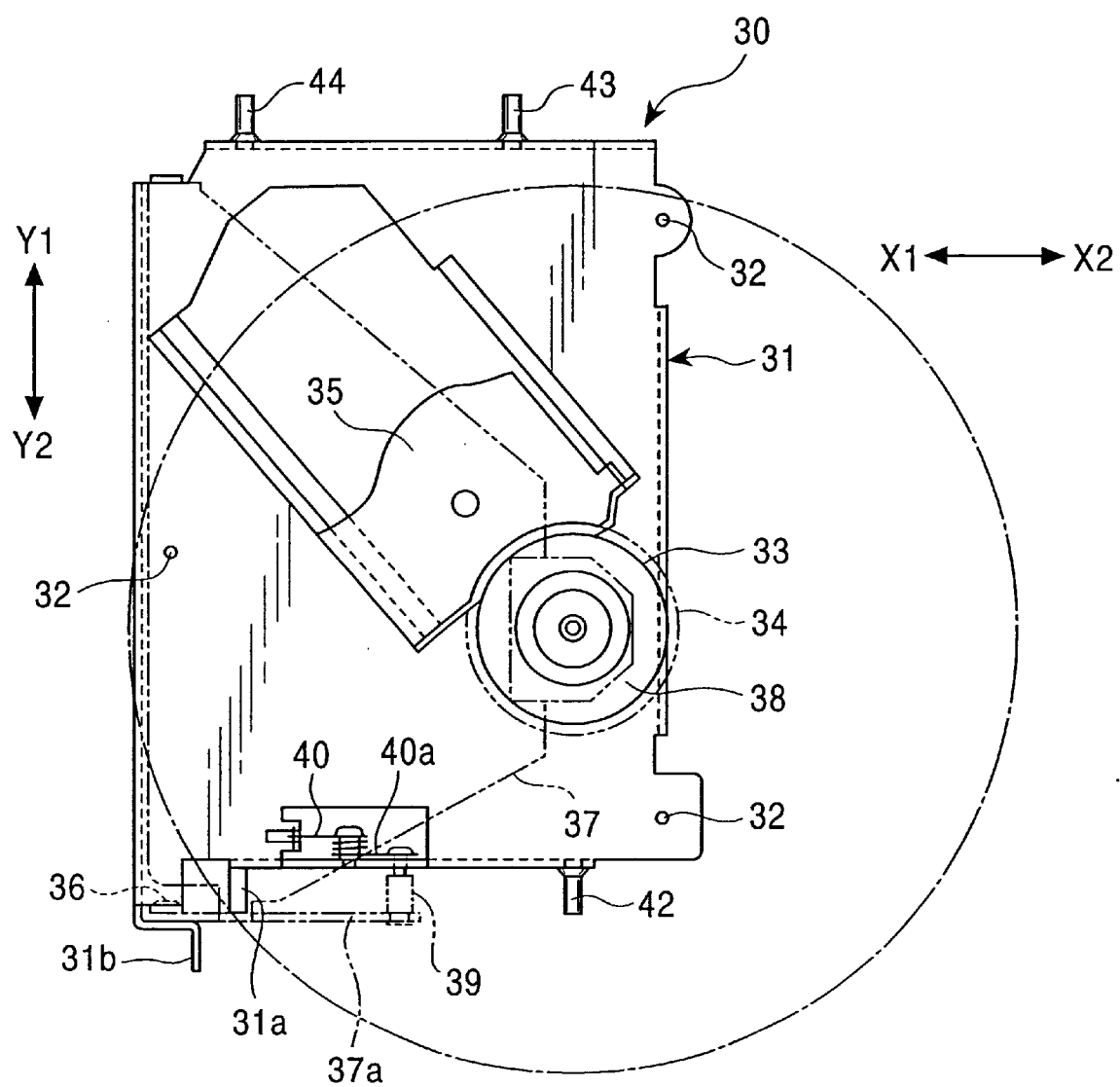
FIG. 5 is a plan view of the disc driving section.

FIG. 1 is a side view of a disc apparatus according to the present invention; FIG. 2 is a plan sectional view thereof; FIG. 3 is a plan view showing exclusively an ascent/descent unit; FIG. 4 is a perspective view showing the ascent/descent unit and a disc driving section mounted thereon; and FIG. 5 is a plan view of the disc driving section.

(General Construction and Magazine Construction)

As shown in FIGS. 1 and 2, a casing 10 is rectangular in plan view. A nose 11 serving as a decorative portion is secured to the front portion of the casing 10. An insert opening is provided in this nose 11, and a magazine M is inserted through this insert opening in the longitudinal direction of the casing 10. The magazine M is held in a condition in which it protrudes forward from the casing 10. Thus, the front portion of the interior of the casing 10 is a magazine installing section (disc installing section) I, and the rear portion of the interior of the casing 10 is a selective drive section II.

The magazine M is a box having an opening M1 on the left-hand side as seen in the drawing (the rear side of the apparatus, on the X1 side). In the magazine M, a plurality of trays T are accommodated such that they can be drawn out from the opening M1. As shown in FIG. 2, the plan configuration of each tray is such that a recess T1 is formed in the front edge portion directed to the opening M1, and an arcuate portion T2 is formed at the center of this recess T1. On both sides in the width direction (Y-direction), holding grooves T3 are formed.

In the condition in which a disc D is placed on the tray T, the edge portions in the width direction (Y-direction) of the disc D are inserted into the holding grooves T3. The central hole of the disc D appears in the arcuate portion T2. The inner diameter of this arcuate portion T2 is somewhat larger than the diameter of a turntable 33 of a disc drive section 30 described below.

In the condition in which the disc D is placed on the tray T, the front portion (X1-side portion) of the disc D is positioned on the recess T1. In the condition in which the disc D is clamped to the turntable 33 of the disc driving section 30, the tray T is returned to the magazine M in an empty state. At this time, as shown in FIG. 2, the rear end portion on the X2-side of the disc D clamped to the turntable 33 is opposed to the recess T1 of the tray T positioned in the magazine M, and the disc D being driven and the tray T returned to the magazine M are not superimposed one upon the other, so that the turning of the disc D is not hindered by the tray T.

A protrusion T4 is integrally formed at the end on the X2-side of the tray T. A holding plate spring M2 is mounted in the interior on the X2-side of the magazine M, and the protrusion T4 of the tray T accommodated in the magazine M is held by the holding plate spring M2, whereby the tray T is prevented from being detached. Further, an engagement recess T5 is provided in the front portion on the X1-side of the tray T and on the Y1-side, and the edge portion on the drawn-out side (X1-side) of the engagement recess T5 constitutes an engagement holding portion T5a.

In the selective drive section II of the casing 10, there is provided an ascent/descent unit 20. FIG. 4 is a perspective view showing the construction of the ascent/descent unit 20, and FIG. 3 is a plan view showing the construction of an ascent/descent chassis 21 of the ascent/descent unit 20.

As shown in FIGS. 1 and 4, guide pins 22 are secured to both sides of the ascent/descent chassis 21 constituting the ascent/descent unit 20. As shown in FIG. 1, vertically extending ascent/descent guide grooves 10a are formed in the side plates of the casing 10, and the guide pins 22 are inserted into the ascent/descent guide grooves 10a. In the selective drive section II, the ascent/descent chassis 21 is supported in the casing 10 so as to be vertically movable.

As shown in FIG. 1, a selective drive plate 23 is provided on the outer side of one side plate of the casing 10, and supported so as to be slidable in the X1–X2 directions. A similar selective drive plate is provided on the other outer side of the casing 10. At the bottom of the casing 10, there is provided a selective driving section (not shown) for driving the selective drive plates in opposite directions.

As shown in FIG. 1, formed in the selective drive plate 23 are selection holes 23a, which are inclined and formed in a step-like configuration. The guide pins 22 provided on the ascent/descent chassis 21 are inserted in the selection holes 23a.

In FIG. 1, when the selective drive plate 23 moves in the X1-direction, the ascent/descent unit 20 descends as it is guided by the selection holes 23a; when the selective drive plate 23 moves in the X2-direction, the ascent/descent unit 20 ascends. When the guide pins 22 are positioned at the step portion of the selection holes 23a, the ascent/descent unit 20 stops at a position when one of the trays in the magazine M can be selected.

(Construction of Ascent/Descent Unit and Disc Driving Section)

As shown in FIG. 4, the ascent/descent chassis 21 comprises a bottom plate 21a, and side plates 21b and 21c bent so as to be raised on either side of the bottom plate 21a. The guide pins 22 are secured to one side plate 21b. Another guide pin 22 is also secured to the other side plate 21c. Further, an outwardly extending guide member 21f is formed by bending on the side plate 21c. The guide member 21f is guided in the selection holes 23a of the selective drive plate 23a with the guide pin 22.

Dampers 25 serving as elastic support members are mounted on the bottom plate 21a. Holes 25a are provided at the center of the dampers 25. Three downwardly extending support pins 32 are secured to a drive chassis 31 of the disc driving section 30, and these support pins 32 are supported by the holes 25a of the dampers 25, whereby the disc driving section 30 is elastically supported on the bottom plate 21a of the ascent/descent chassis 21 through the intermediation of the dampers 25. Since the disc driving section 30 is elastically supported on the ascent/descent chassis 21, it is possible to prevent the vibration of the vehicle from being directly transmitted to the disc driving section 30 even when the vibration of the vehicle body acts on the casing 10.

As shown in FIG. 5, the turntable 33 is rotatably supported by the drive chassis 31. A spindle motor 34 for rotating the turntable 33 is secured to the bottom of the drive chassis 31. Further, the drive chassis 31 is provided with an optical head 35, and a thread mechanism for moving the optical head 35 along the recording surface of the disc is mounted.

As shown in FIG. 4, a clamp arm 37 is provided on the drive chassis 31. The base portion of the clamp arm 37 is rotatably supported on the drive chassis 31 by a rotation fulcrum 36. Further, a damper 38 is rotatably supported by the forward end portion of the clamp arm 37.

A raising arm 37a extending the X2-direction is integrally provided on the side portion of the clamp arm 37, and a raising pin 39 is secured to the forward end portion of the raising arm 37a. The drive chassis 31 is provided with a clamp spring 40. The clamp spring 40 is a torsion spring whose one arm is supported by the drive chassis 31 and the other arm 40a is engaged from above with the raising pin 39. By the resilient force of this clamp spring 40, the clamp arm 37 is biased in the direction of the drive chassis 31 and the clamper 38 is pressed by the turntable 33.

As shown in FIG. 5, on the Y2-side of the drive chassis 31, a lock pin 42 is secured to the front portion which is opposed to the magazine M (X2-side), and on the rear side, which is opposed thereto, a lock member 31a is integrally formed by bending. On the Y1-side of the drive chassis 31, a lock pin 43 is secured to the front portion, and a lock pin 44 is secured to the rear portion.

(Construction of Tray Transferring Means III and Transfer Drive Means IV)

Figure 8:
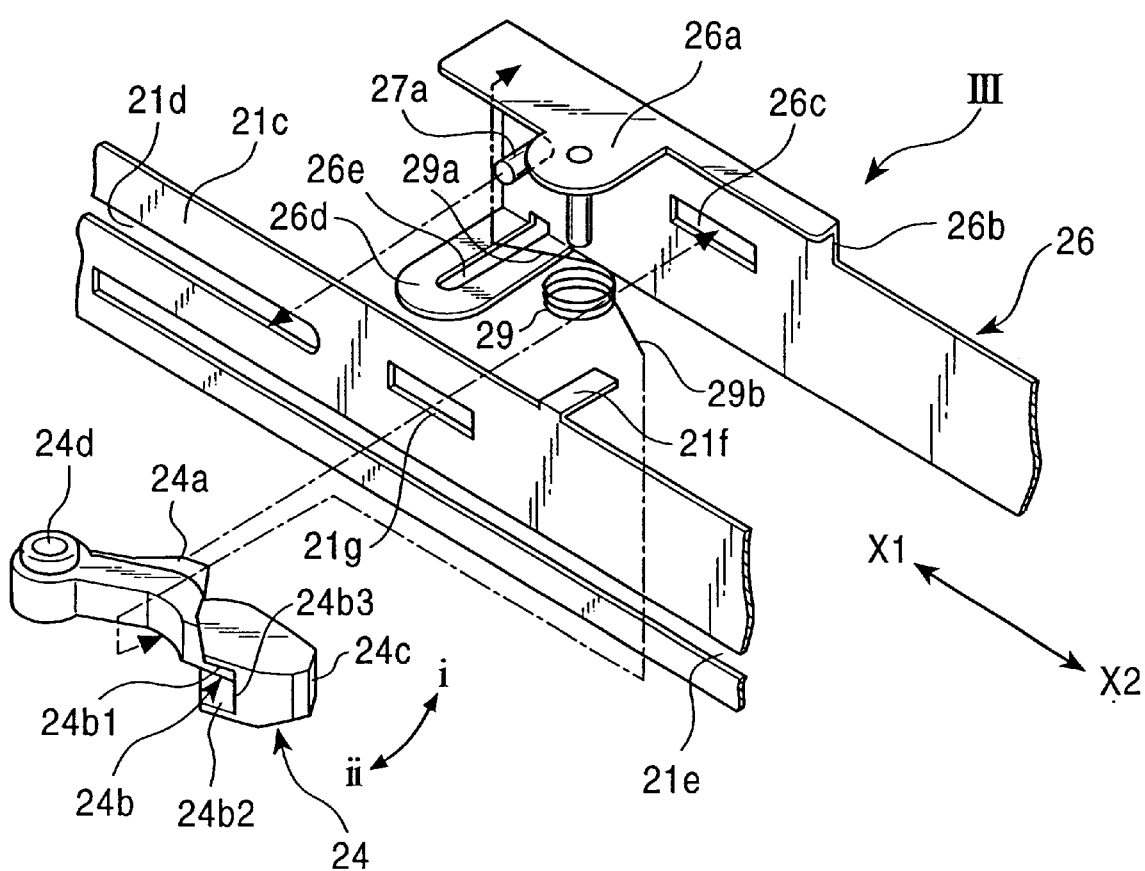
FIG. 8 is an exploded perspective view showing tray transferring means.

As shown in FIGS. 2, 3 and 4, the side plate 21c on the Y1-side of the ascent/descent chassis 21 extends in the X1–X2 direction to form a transfer guide section. A tray transferring means III is provided on the side plate 21c which is the transfer guide section. The construction of the tray transferring means III will now be described. FIG. 8 is an exploded perspective view showing the construction of the tray transferring means III.

A pair of transfer guide grooves 21d and 21e extending in the X1–X2 direction are formed in the side plate 21c. A transfer member 26 is provided on the outside of the side plate 21c. This transfer member 26 is formed by bending a sheet metal. A pair of guide pins 27a and 27b are secured to the transfer member 26. One guide pin 27a is inserted into one transfer guide groove 21d and the other guide pin 27b is inserted into the other transfer guide groove 21e. Thus, the transfer member 26 is guided by the transfer guide grooves 21d and 21e and can move in the X1–X2 direction on the outside of the side plate 21c.

The transfer member 26 is at its limit of movement in the X2-direction when the guide pins 27a and 27b have moved to the end on the X2 side of the transfer guide grooves 21d and 21e.

At the upper end of the transfer member 26, there is provided a support member 26a bent substantially at right angles; this support member 26a extends on the inner side (Y2 side) of the side plate 21c. Secured to this support member 26a is a support pin 28 extending downward on the inner side of the side plate 21c. A hook 24 is mounted to this support pin 28. As shown in FIG. 8, a support hole 24d is formed at the base of the hook 24, and the support pin 28 is passed through this support hole 24d, the hook 24 being supported so as to be rotatable in the engagement canceling direction (direction (i)) and engaging direction (direction (ii)).

An engagement canceling spring 29 is fitted onto the support pin 28. This engagement canceling pin 29 is a torsion spring whose one arm 29a is engaged with the support member 26a and the other arm 29b is engaged with the hook 24. The hook 24 is biased in the engagement canceling direction (direction (i)) by this engagement canceling spring 29.

As shown in FIG. 8, a sliding protrusion 24a is integrally formed on the back portion of the hook 24 opposed to the side plate 21c. Further, a canceling window 21g is provided in the side plate 21c. Further, formed in the transfer member 26 is a relief window 26c which overlaps the canceling window 21g when the transfer member 26 has reached its limit of movement in the X2-direction.

When the transfer member 26 has reached the limit of movement in the X2-direction and the relief window 26c has overlapped the canceling window 21g, the sliding protrusion 24a of the hook 24, biased in the engagement canceling direction (direction (i)), enters the interior of the canceling window 21g and the relief window 26c, and the hook 24 rotates in the engagement canceling direction (direction (i)). In FIG. 2, the hook 24 rotating in the engagement canceling direction is indicated by a solid line.

When the transfer member 26 moves in the drawing out direction (X1-direction) from the state in which the hook 24 is rotating in the engagement canceling direction, the sliding protrusion 24a comes out of the canceling window 21g and, after this, the sliding protrusion 24a slides on the inner surface of the side plate and the inner wall above the transfer guide groove 21d. Thus, at the point in time when the transfer member 26 and the hook 24 supported thereby start to move in the X1-direction from the position shown in FIGS. 2, 4, and 8, the sliding protrusion 24a comes out of the canceling window 21g and the hook 24 rotates in the engaging direction (direction (ii)) and so moves in the X1-direction.

As shown in FIG. 8, a holding recess 24b which is inwardly (Y2 side) directed is formed at the forward end portion of the hook 24. While in FIG. 2 the condition in which the hook 24 has rotated in the engaging direction (direction (ii)) is indicated by a broken line, when the hook 24 rotates in the engaging direction, the engagement retaining portion T5a of the tray T is held by the holding recess 24b. At this time, the engagement retaining portion T5a of the tray T is constrained from above and below by the upper wall 24b1 and 24b2 of the holding recess 24b of the hook 24, and retained, and, at the same time, the engagement retaining portion T5a is drawn out in the X1-direction by the retract wall 24b3 of the holding recess 24b.

In the condition in which the hook 24 has rotated in the engaging direction (direction (ii)), the hook 24 enters the engagement recess T5 of the tray T. Thus, in this condition, when the transfer member 26 and the hook 24 move in the X2-direction, the edge portion T5b on the X2 side of the engagement recess T5 is pressed in the X2-direction by the pressing surface 24c at the forward end of the hook 24.

Thus, as the transfer member 26 and the hook 24 move in the X1–X2 directions, the tray T reciprocates between the accommodated position (iii) in the magazine M and the drawn-out position (iv) at which the tray T is superimposed on the disc driving section 30.

While this is happening, the engagement retaining portion T5a of the tray T is held by the holding recess 24b of the hook 24 and moves in the X1–X2 directions, so that, while the Y1-side edge of the tray T reciprocates between the accommodated position (iii) and the drawn-out position (iv), there is no vertical play of the Y1-side edge portion of the tray T. Thus, it is only necessary for a guide member (not shown) guiding the tray T to be provided on the Y2-side. This guide member is secured to the inner surface of the side plate 21b on the Y-2 side of the ascent/descent chassis 21 shown in FIG. 4.

Next, the transfer drive means IV for reciprocating the transfer member 26 will be described.

As shown in FIGS. 2 and 4, there is provided a motor 50 on the Y2 side above the bottom plate 21a of the ascent/descent chassis 21. A worm gear 51 is secured to the output shaft of the motor 50. The bottom plate 21a is provided with a reduction gear group 52, and the worm gear 51 is in mesh with the input side gear of the reduction gear group 52.

A round raised portion 21h is formed on the bottom plate 21a, and a cam gear 53 as a rotary member is provided below this raised portion 21h. This cam gear 53 is rotatably supported by a support shaft 54 secured to the center of the circle of the raised portion 21h. Teeth of a predetermined module are continuously formed over the entire outer periphery of the cam gear 53, which teeth are in mesh with a pinion gear 52a provided on the reduction output side of the reduction gear group 52. Thus, by the normal and reverse rotation of the motor 50, the cam gear 53 is continuously rotated at a fixed reduced speed clockwise (CW) and counterclockwise (CCW).

As shown in FIG. 2, the clockwise and counterclockwise torque of the cam gear 53 are converted to a reciprocating movement by a converting means VI, and transmitted to the transfer member 26.

The converting means VI has a driving member 55 in an arm-like configuration. This driving member 55 is provided below the bottom plate 21a of the ascent/descent chassis 21, and the end portion thereof on the Y2 side is rotatably supported on the lower surface of the bottom plate 21a by a support shaft 56.

A drive pin 59 is secured to the forward end of the driving member 55. Formed in the transfer member 26 is a drive member 26d extending from below on the inner side of the side plate 21c, and an elongated hole 26e is formed in this drive member 26d. The drive pin 59 is rotatably inserted into the elongated hole 26e.

A cam 57 is formed on the driving member 55. This cam 57 is in the form of a hole, and a first drive constraining portion 57a is formed on one side thereof and a second drive constraining portion 57b is formed on the other side thereof. Between the constraining portions 57a and 57b, a first play region 57c and a second play region 57d are formed. These play regions 57c and 57d have an arcuate configuration. In FIG. 2, when the driving member 55 rotates to the rotation end in the clockwise direction to reach the accommodation drive position (vi), the first play region 57c coincides with the arcuate locus around the support shaft 54 of the cam gear 53. When the driving member 55 rotates to the rotation end in the counterclockwise direction to reach the drawn-out drive position (vii), the second play region 57d coincides with the arcuate locus around the support shaft 54.

A slide shaft 58 serving as a follower is secured to the lower surface of the cam gear 53. The slide shaft 58 is inserted into the cam 57 of the driving member 55.

When the slide shaft 58 is at the position (viii) where it abuts the first play region 57c, the converting means VI is at the origin of operation. While the slide shaft 58 continuously rotates from the origin of operation (viii) by 360 degrees or an angle somewhat smaller than 360 degrees, the slide shaft 58 is fitted into the first drive constraining portion 57a, and the driving member 55 is rotated counterclockwise from the accommodation drive position (vi) to the drawn-out position (vii) by the first drive constraining portion 57a. When the driving member 55 rotates to the drawn-out position (vii), the slide shaft 58 continuously rotating counterclockwise comes out of the first drive constraining portion 57a and slides on the second play region 57d. While the slide shaft 58 is sliding on the second play region 57d, the driving member 55 is at rest at the drawn-out position (vii).

Further, when the slide shaft 58 rotates counterclockwise and is detached from the second play region 57d to be fitted in the second drive constraining portion 57b, the driving member 55 is caused to rotate clockwise by the torque of the slide shaft 58 after that, and when the slide shaft 58 comes out of the second drive constraining portion 57b to reach the first play region 57c, the driving member 55 is restored to the accommodation drive position (vi). After this, when the slide shaft 58 rotating counterclockwise slides on the first play region 57c, and reaches the origin of operation (viii) or a position somewhat before that, the end of operation is reached, and the cam gear 53 stops at this point in time.

Next, the motor 50 makes a reverse rotation, and while the cam gear 53 rotates clockwise from the drive end and returns to the drive origin (viii), an operation reverse to the above is effected; the driving member 55 rotates counterclockwise to reach the drawn-out drive position (vii), and at that position, the slide shaft 58 slides on the second play region 57d. After this, the driving member 55 rotates clockwise and is restored to the accommodation drive position (vi), and the slide shaft 58 is restored to the origin of operation (viii), and the cam gear 53 stops. (Construction of Clamp means VIII and Lock Means VII) The slide shaft 58 shown in FIG. 2 is secured to the lower surface of the cam gear 53 provided on the ascent/descent chassis 21. As shown in FIG. 3, a switching cam 60 in the form of a recess is formed on the upper surface of this cam gear 53. The switching cam 60 has a lock portion 61, a first play portion 62 of an arcuate locus around the support shaft 54, a first switching drive portion 63, a second play portion 64 of an arcuate locus around the support shaft 54, a second switching drive portion 65, and a lock portion 66 in that order clockwise.

On the upper surface of the bottom plate 21a of the drive chassis 21, a first switching member 71 and a second switching member 72 are mounted so as to be slidable in the X1–X2 directions. A slide shaft 73 serving as a follower is secured to the lower surface of the first switching member 71. The slide shaft 73 is inserted so that it can slide in the switching cam 60 of the cam gear 53 through the opening formed in the bottom plate 21a.

On the upper surface of the bottom plate 21a, a joint member 74 is rotatably supported by a support shaft 75. A joint pin 76 is provided at one end of the joint member 74 and is engaged with the first switching member 71. A joint pin 77 is provided at the other end of the joint member 74 and is engaged with a second switching member 72.

When the cam gear 53 continuously rotates counterclockwise (CCW) from the state in which the slide shaft 73 is fitted into the lock portion 61, the first switching member 71 moves a little in the X2-direction while the slide shaft 73 comes out of the lock portion 61, and the second switching member 72 moves a little in the X1-direction. After this, the slide shaft 73 slides in the first play portion 62. At this time, the first switching member 71 and the second switching member 72 remain at rest. While the slide shaft 73 is moving in the first play portion 62, the slide shaft 58 shown in FIG. 2 is fitted into the drive constraining portion 57a formed in the cam 57 of the driving member 55, and the driving member 55 is driven counterclockwise.

While the driving member 55 shown in FIG. 2 moves to the drawn-out drive position (vii), and the slide shaft 58 comes out of the drive constraining portion 57a and slides in the second play region 57d, and the driving member 55 is at rest at the drawn-out drive position (vii), the slide shaft 73 shown in FIG. 3 and the first switching drive portion 63 slide, and the first switching member 71 is moved in the X2-direction, and the second switching member 72 is moved in the X1-direction. After this, while the slide shaft 73 and the second play portion 64 slide, the first switching member 71 and the second switching member 72 remain at rest. While this is happening, the slide shaft 58 shown in FIG. 2 is fitted into the second drive constraining portion 57b, and the driving member 55 is driven clockwise to reach the accommodation drive position (vi).

When the driving member 55 is at rest at the accommodation drive position (vi) and the slide shaft 58 is sliding in the first play region 57c, the slide shaft 73 and the second switching drive section 65 in FIG. 3 slide, and the first switching member 71 is driven in the X2-direction, and the second switching member 72 is driven in the X1-direction. Then, the slide shaft 73 is fitted into the lock portion 66. At this time, the motor 50 stops, and the cam gear 53 stops.

After the slide shaft 73 is fitted into the lock portion 66 and the cam gear 53 stops, the motor 50 rotates in the reverse direction again, and, when the cam gear 53 starts to rotate clockwise, the slide shaft 73 comes out of the lock portion 66 and slides in the second switching drive section 65, and the first switching member 71 is driven in the X1-direction and the second switching member 72 is driven in the X2-direction. While this is happening, the driving member 55 shown in FIG. 2 is at rest at the accommodation drive position (vi). After this, when the slide shaft 73 slides in the second play portion 64, the switching members 71 and 72 stop and the driving member 55 is driven counterclockwise to reach the drawn-out drive position (vii). Further, while the slide shaft 73 slides in the first switching drive portion 63, the first switching member 71 is driven in the X1-direction and the second switching member 72 is driven in the X2-direction, with the driving section 55 being at rest at the drawn-out drive position (vii). When the slide shaft 73 slides in the first play portion 62, the driving member 55 is driven clockwise to reach the accommodation drive position (vi).

Figure 6:
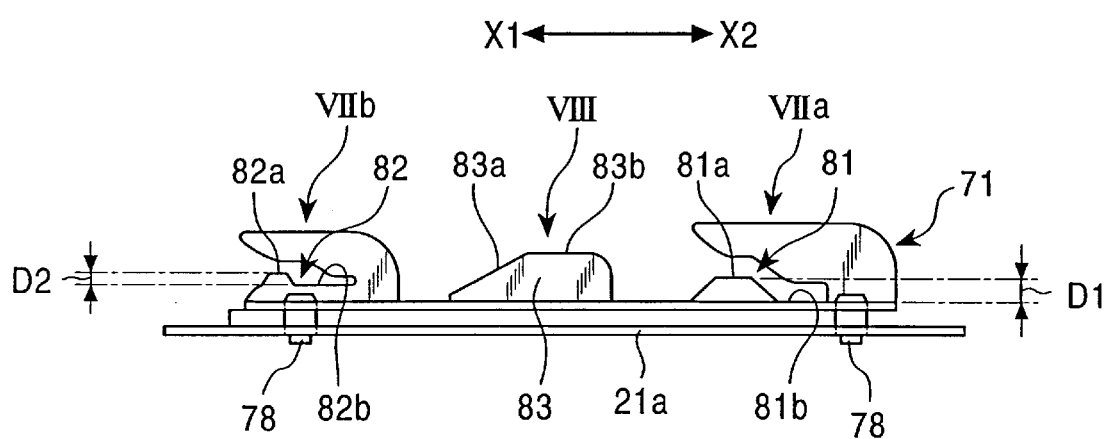
FIG. 6 is a side view of a first switching member.

Between the moment the slide shaft 73 fastened to the first switching member 71 is fitted into the lock portion 61 of the switching cam 60 formed on the cam gear 53 and the moment it is fitted into the lock portion 66, it is within an angular range in which the cam gear 53 is rotatable. That is, as shown in FIGS. 3 and 6 (the side view of the first switching member 71), guide pins 78 are secured to the bottom plate 21a of the ascent/descent chassis 21, and guide grooves 71a allowing the guide pins 78 to slide therein and extending in the X1–X2 directions are formed in the first-switching member 71, the guide range of the guide grooves 71a with respect to the guide pins 78 being the range of movement for the first switching member 71. At the limit position of this range of movement, the slide shaft 73 is fitted into the lock portions 61 and 66, determining the rotation limit of the cam gear 53.

When the cam gear 53 reaches the rotation limit, the amount of electric current flowing through the motor 50 increases. By detecting this increase in current, the motor 50 is controlled to be stopped. In this way, the cam gear 53 is continuously rotated clockwise and counterclockwise to operate the driving member 55 and the first switching member 71 and the second switching member 72. Since the rotation limit of the cam gear 53 is determined through the engagement of the first switching member 71 with the cam gear 53, there is no need to provide a detecting member such as a switch or a stopper, making it possible to determine the range of movement for the driving member 55, the first switching member 71, and the second switching member 72 through simple control operation. However, it is also possible to detect the movement limit of the first switching member 71 by a switch or the like to thereby stop the motor 50. In this case also, the control of the cam gear 53 is effected through continuous rotation, so that the control operation itself is simple.

FIG. 6 is a side view of the first switching member 71. This first switching member 71 is provided with a front lock means VIIa, a rear lock means VIIb, and a clamp means VIII. These means consist of raised portions formed by bending the first switching member 71. As shown in FIG. 4, the second switching member 72 is also provided with a front lock means VIIa and a rear lock means VIIb. However, since the first switching member 71 and the second switching member 72 are driven in opposite directions, i.e., X1–X2 directions, the orientation of the lock means VIIa and VIIb provided in the second switching member 72 is opposite to that of the lock means of the first switching member 71 shown in FIG. 6. That is, the lock means VIIa and VIIb provided in the first and second switching members 71 and 72 are symmetrical to each other. Thus, in the following, only the means provided in the first switching member 71 will be described with reference to the drawing.

The front lock means VIIa shown in FIG. 6 constrains the lock pin 42 provided on the front side, which is the side facing the tray T in the side plate of the drive chassis 31 shown in FIGS. 4 and 5, and the rear lock means VIIb constrains the lock member 31a provided on the rear side of the drive chassis 31. The lock pins 43 and 44 provided in the other side portion of the driving section 30 shown in FIG. 5 are constrained by the lock means VIIa and VIIb provided in the second switching member 72.

The front lock means shown VIIa in FIG. 6 has a lock groove 81, and the rear lock means VIIb has a lock groove 82. Each of these lock grooves 81 and 82 has an opening on the X1-side. On the X2-side of the opening are horizontal constraining portions 81a and 82a, respectively, an d the horizontal constraining portions 81a and 82a have the same height. On the X2-side of the lock grooves 81 and 82 are descent constraining portions 81b and 82b, respectively. Assuming that the difference in height between the horizontal constraining portion 81a and the descent constraining portion 81b in the front lock means VIIa, that is, the descent dimension, is D1, and that the difference in height between the horizontal constraining portion 82a and the descent constraining portion 82b in the rear lock means VIIb, that is, the descent dimension, is D2, D1 is greater than D2. The front lock means provided in the second switching member 72 and the lock groove provided in the rear lock means are directed opposite to those of FIG. 6. However, the construction and the descent dimension thereof are the same as those of the first switching member 71.

Further, as shown in FIG. 4, horizontal lock means VIIc is provided on the bottom plate 21a of the ascent/descent chassis 21. This horizontal lock means VIIc is provided with a lock member 84 rotatably supported by a shaft 85 extending vertically. In the upper portion of this lock member 84, there is formed a lock groove 84a, and in the lower portion thereof, there is formed a cam groove 84b. When the first switching member 71 moves in the X1-direction, the shaft secured to the first switching member 71 slides in the cam groove 84b, whereby the lock member 84 is rotated clockwise, and the lock groove 84a is fitted into the side lock member 31b formed in the drive chassis 31, and the driving section 30 is constrained in the X1–X2 directions and locked.

The clamp means VIII provided in the first switching member 71 is provided with a clamp cam 83 for controlling the raising pin 39 secured to the clamp arm 37 of the driving section 30. The X1-side of this clamp cam 83 is an inclination side 83a, and the X2-side thereof is a raising side 83b.

Figure 7A:
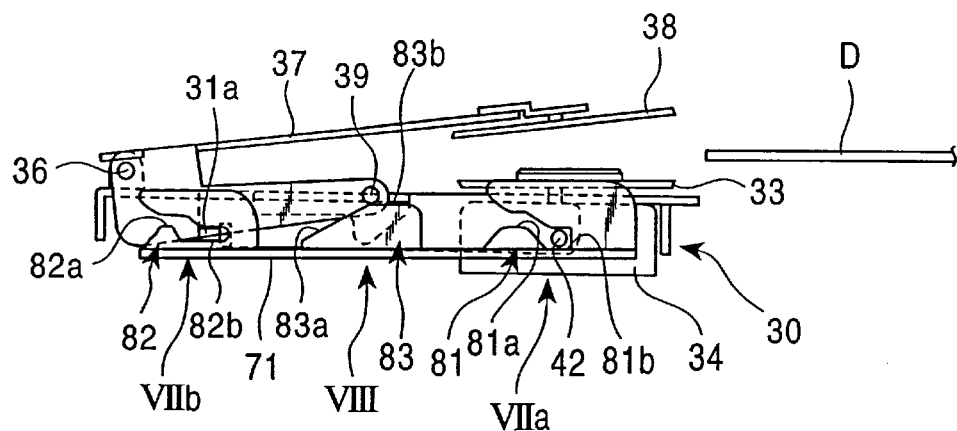
FIG. 7A is a side view of the disc driving section in a disc-drawn-out standby state.
Figure 7B:
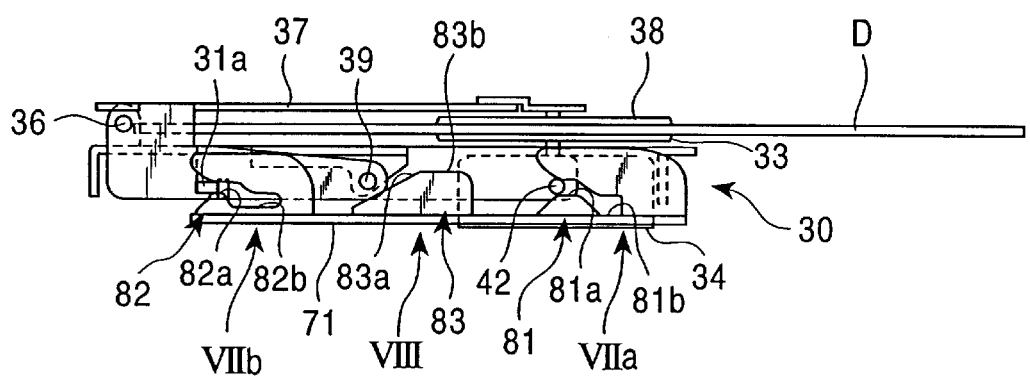
FIG. 7B is a side view of the disc driving section in a state in which it is locked and clamped by horizontal constraint.
Figure 7C:
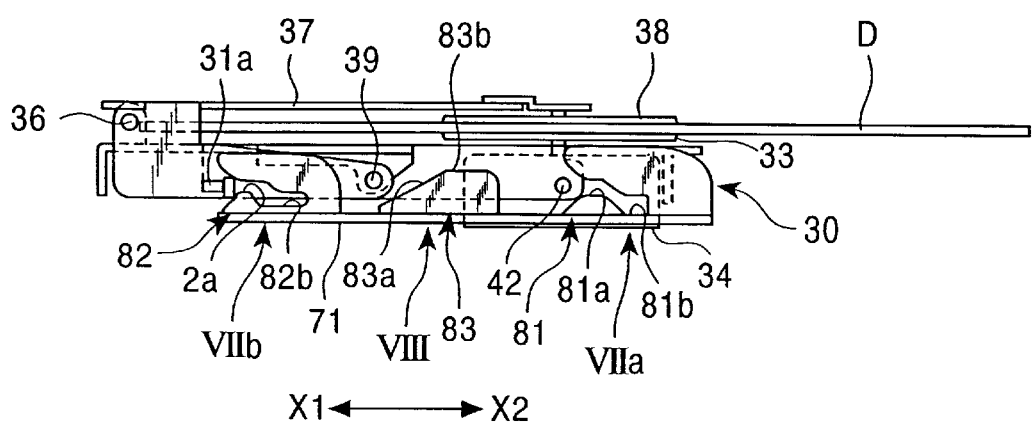
FIG. 7C is a side view of the disc driving section in a lock-canceled state.

FIGS. 7A, 7B, and 7C are side views showing the operation of the disc driving section 30. In FIG. 7A, the disc driving section 30 is in a disc standby state; in FIG. 7B, the disc driving section 30 is in the locked state and disc clamp state; and in FIG. 7C, the disc driving section 30 is in the lock cancel state and disc clamp state.

Figure 9:
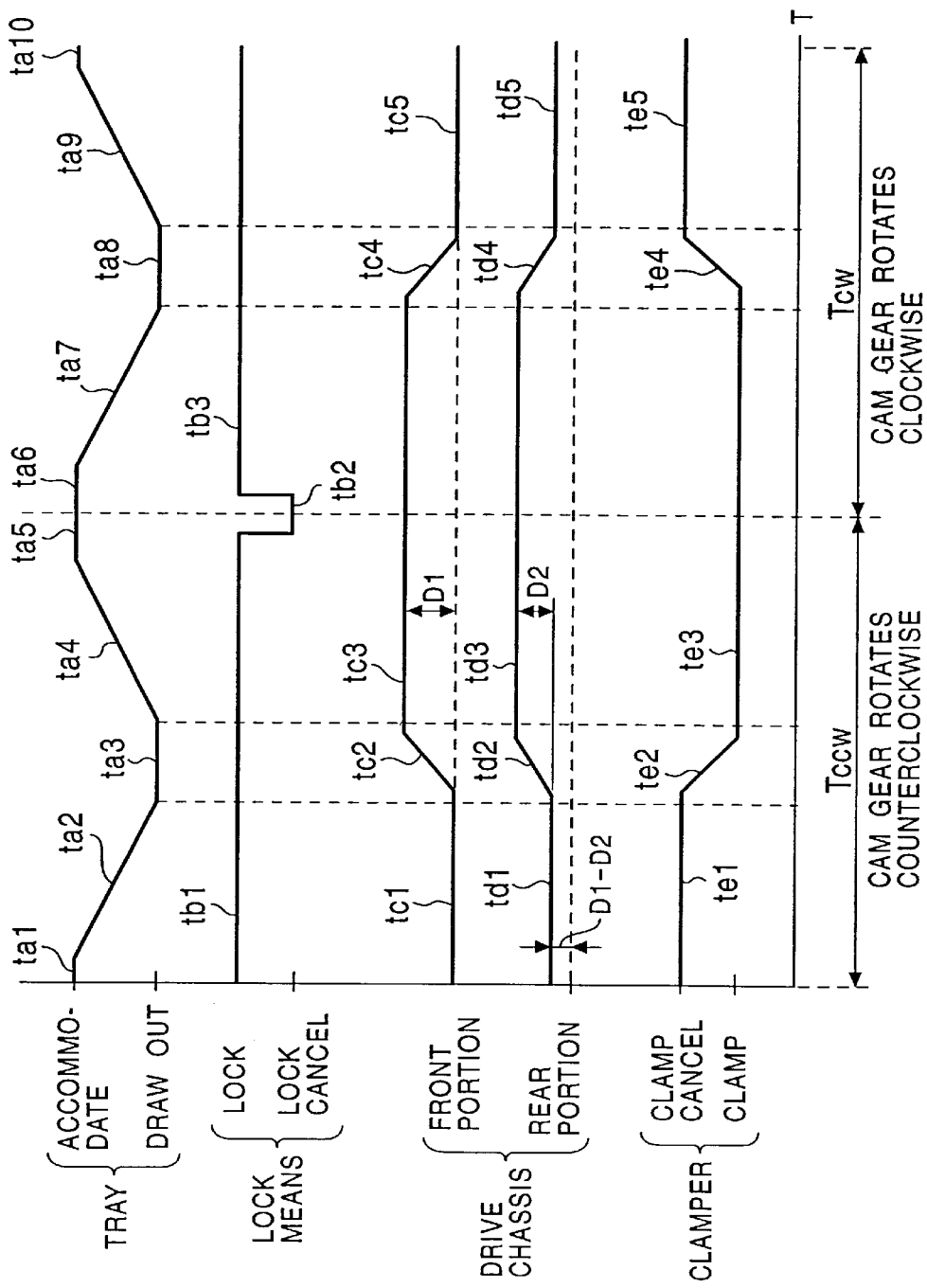
FIG. 9 is a time chart showing the operation of the disc driving section.
Figure 10A:
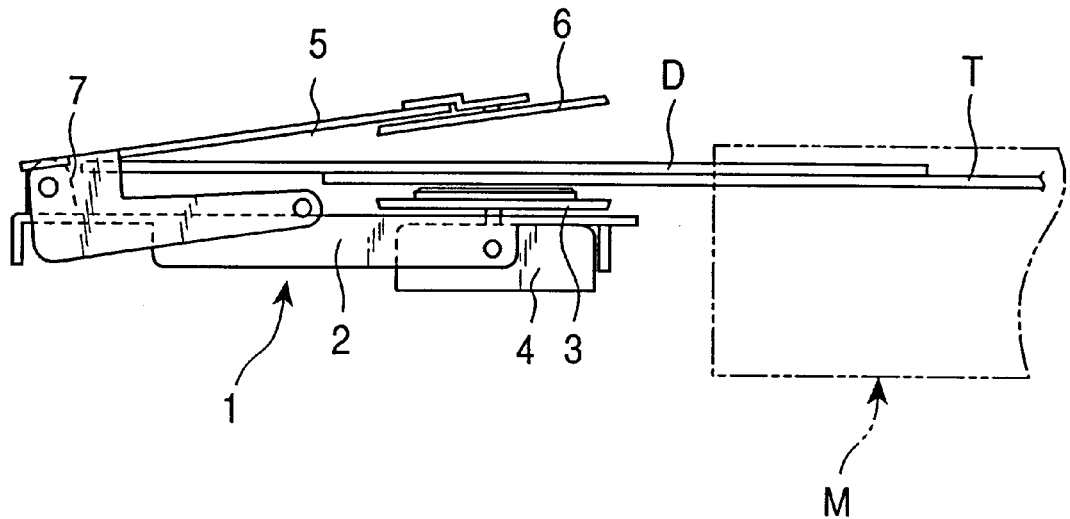
FIG. 10A is a side view of a conventional disc apparatus in a disc standby state.
Figure 10B:
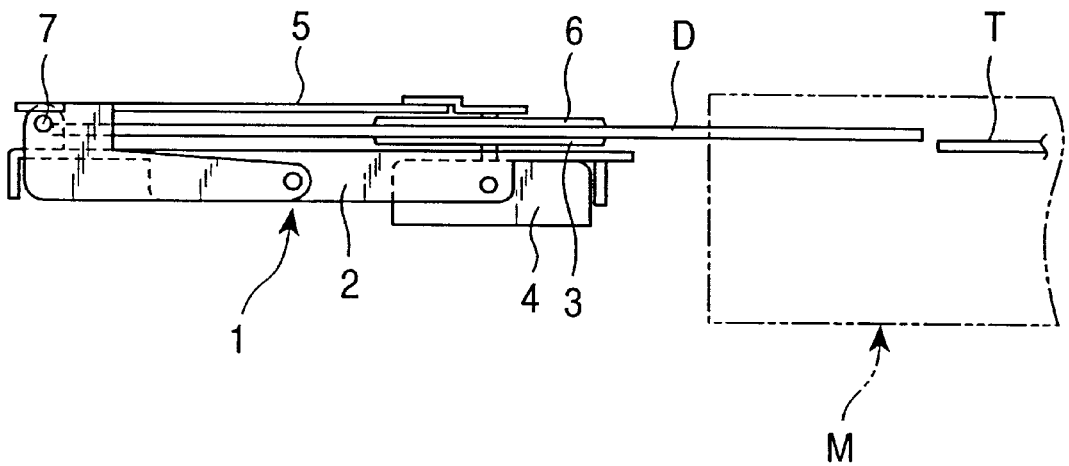
FIG. 10B is a side view of the conventional disc apparatus in a disc-clamped state.

FIG. 9 is a time chart showing the operation of each part of the disc apparatus.

(Tray Selecting Operation)

In FIG. 2, when the slide shaft 58 is positioned at the origin of operation indicated by numeral (viii), it is at the rotation limit position when the cam gear 53 rotates clockwise (CW). When it is at this origin of operation, in FIG. 3, the slide shaft 73 provided in the first switching member 71 is fitted into the lock portion 61 of the switching cam 60.

At the origin of operation (initial state), as shown in FIG. 2, the driving member 55 is rotated clockwise and positioned at the accommodation drive position (vi), and the transfer member 26 connected to the forward end of the driving member 55 is moved to the X2-side. The slide protrusion 24a on the back surface of the hook 24 provided in the transfer member 26 enters the canceling window 21g of the side plate 21c of the ascent/descent chassis 21, and the hook 24 rotates in the engagement canceling direction (i), and the hook 24 is spaced apart from the side portion of the tray T as indicated by the solid line in FIG. 2.

In the above initial state, the tray selecting operation in the magazine M is performed. By the motor of the selective drive portion (not shown), the selective drive plate 23 shown in FIG. 1 is driven in the X1-direction or the X2-direction, and, by the selection holes 23a formed in the selective drive plate 23, the guide pins 22 are vertically guided, and the ascent/descent unit 20 shown in FIG. 4 moves vertically carrying the disc driving section 30. When the selective drive plate 23 stops, with the guide pins 22 coinciding with the step portion of one of the selection holes 23a shown in FIG. 1, the ascent/descent position of the ascent/descent unit 20 is determined, and the disc driving section 30 stops in front of the selected tray T, and the hook 24 mounted to the ascent/descent chassis 21 is opposed to the side of the engagement recess T5 of the selected tray T.

(Disc Drawing-Out/Loading Operation)

When the tray selecting operation is completed and the ascent/descent unit 20 stops, the motor 50 shown in FIGS. 2 and 3 starts, and the cam gear 53 continuously rotates counterclockwise from the origin of operation (viii). While this is happening, the cam gear 53 rotates at a fixed speed until the slide shaft 73 shown in FIG. 3 is fitted into the lock portion 66 using the lock portion 61 of the switching cam 60 as the starting point. The angle of the continuous rotation of the cam gear 53 is 360 degrees or somewhat smaller than 360 degrees.

In FIG. 9, the horizontal axis indicates time, and Tccw indicates the operating time that the cam gear 53 continuously rotates counterclockwise (CCW) from the start point to the end point.

While the cam gear 53 continuously rotates counterclockwise, the selected tray T at the accommodated position in the magazine M is drawn out in the X1-direction, and the disc D on the tray T is clamped to the disc driving section 30 and the empty tray T is transferred in the X2-direction and restored to the accommodated position in the magazine M.

At ta1 in FIG. 9, as shown in FIG. 2, the selected tray T is at the accommodated position (iii) in the magazine M. Further, the first switching member 71 shown in FIGS. 3 and 4 is moved to the X1-side and the second switching member 72 is moved to the X2-side. At this time, the lock pin 42 provided in the side portion of the drive chassis 31 of the disc driving section 30 is held in the descent constraining portion 82b of the lock groove 82 of the rear lock means VIIb. Further, the raising pin 39 is raised upward by the raising side 83b of the clamp cam 83 of the clamp means VIII. In the horizontal lock means VIIc shown in FIG. 4, the lock member 84 is rotated clockwise, and the side lock member 31b of the drive chassis 31 is constrained in the X1–X2 directions by the lock groove 84a of the lock member 84.

That is, in the initial state, as indicated by tb1 of FIG. 9, the disc driving section 30 is locked on the ascent/descent chassis 21. Further, since the lock pin 42 and the lock member 31a of the drive chassis 31 are held by the descent constraining portion 81b of the lock groove 81 and the descent constraining portion 82b of the lock groove 82, the drive chassis 31 as a whole is lowered so as to approach the bottom plate 21a of the ascent/descent chassis 21. However, as shown in FIG. 6, the descent distance D1 of the front descent constraining portion 81b is larger than the descent distance D2 of the rear descent constraining portion 82b, so that the lock pin 42 provided on the front side of the drive chassis 31 is lowered to a larger degree than the lock member 31a provided on the rear side.

As a result, the drive chassis 31 is in an oblique position such that the front side (the side opposed to the tray T) is directed downward and that the whole drive chassis is lowered to the bottom plate 21a side. In FIG. 9, the front height position on the tray T side of the drive chassis 31 is indicated by numeral tc1, and the rear height position is indicated by numeral td1.

On the other hand, the clamp arm 37 is raised upward by the abutting of the raising side 83b of the clamp cam 83 and the raising pin 39, and the damper 38 provided in the forward end portion of the clamp arm 37 is spaced apart from the turntable 33. In FIG. 9, this clamp cancel condition is indicated by numeral te1.

In this initial state, the drive 31 is lowered as shown in FIG. 7A, and it is in an inclined position such that the front side opposed to the tray T is directed downward, and in this position, the damper 38 is spaced apart from the turntable 33, so that, when drawing out the disc D into the disc driving section SO with the tray T drawn out of the magazine M, both the turntable 33 and the damper 38 do not hinder the operation of drawing out the disc D.

When the cam gear 53 rotates counterclockwise from the initial state, the play portion 62 of the switching cam 60 slides on the slide shaft 73 in FIG. 3, and, at this time, the slide shaft 58 is fitted into the drive constraining portion 57a of the cam 57 in FIG. 2. Thus, the driving member 55 is driven counterclockwise, and the transfer member 26 is moved in the X1-direction with the driving member 55. At this time, the slide protrusion 24 of the hook 24 shown in FIG. 8 comes out of the canceling window 21g of the side plate 21c and slides on the inner surface of the side plate 21c. Thus, as indicated by the solid line in FIG. 2, the engagement retaining portion T5a of the tray T is engaged with the hook 24 rotating in the engagement direction (ii), and the tray T is drawn out in the X1-direction from the accommodated position (iii) to the drawnout position (iv). This drawing out operation is indicated by numeral ta2 in FIG. 9.

During the drawing out operation ta2, the first play portion 62 of the switching cam 60 slides on the slide shaft 73 in FIG. 3, so that the first switching member 71 and the second switching member 72 do not move, and the lock operation of the lock means (tb1), the inclined position of the drive chassis 31 (tc1, td1), and the clamp cancel state (te1) continue.

When the slide shaft 58 shown in FIG. 2 comes out of the drive constraining portion 57a and comes to slide on the second play region 57d of the cam 57, the tray T stops at the drawn-out position (iv) as indicated by ta3 in FIG. 9. While this is happening, the slide shaft 73 shown in FIG. 3 slides on the first switching drive section 63 of the switching cam 60, and the first switching member 71 is driven in the X2-direction and the second switching member 72 is driven in the X1-direction.

While this is happening, as shown in FIGS. 7A and 7B, the lock pin 42 provided on the front side of the drive chassis 31 moves from the descent constraining portion 81b of the front lock groove 81 to the horizontal constraining portion 81a and is constrained, and the lock member 31a on the rear side moves from the descent constraining portion 82b of the rear lock groove 82 to the horizontal constraining portion 82a and is retained.

That is, in section ta3 in FIG. 9, in which the operation of drawing out the tray T is completed, the drive chassis 31 is raised (tc2, td2), and held so as to maintain a horizontal position by the horizontal constraining portion 81a and the horizontal constraining portion 82a. In the condition of this horizontal position (tc3, td3), the lock condition (tb1) is continued.

Further, at this time, the raising pin 39 is transferred to the inclined side 83a of the clamp cam 83 by the moving force in the X2-direction of the first switching member 71, and the clamper 38 is lowered (te2) by the biasing force of the clamp spring 40, and the central portion of the disc D on the tray T drawn out is clamped by the turntable 33 and the damper 38.

As described above, after the disc clamp state (the state shown in FIG. 7B) is attained with the drive chassis 31 being locked in the horizontal position, the slide shaft 58 shown in FIG. 2 enters the second drive constraining portion 57b of the cam 57, and, by the rotation afterward, the driving member 55 is rotated clockwise, and the transfer member 26 is returned in the X2-direction, and the tray T is restored to the accommodated position (iii) in the magazine M by the hook 24 provided on the transfer member 26. This restoring operation is indicated at ta4 in FIG. 9. At this time, the disc D is clamped onto the turntable 33, so that the empty tray T is returned to the magazine M. While this is happening, the lock state (tb1) of the drive chassis 31 continues and the disc is in the clamp state (te3).

When the empty tray T is returned to the magazine M (ta5), the slide shaft 58 shown in FIG. 2 slides afterwards in the first play region 57c of the cam 57. While this is happening, the slide shaft 73 shown in FIG. 3 is driven by the second switching drive section 65 of the switching cam 60, and the first switching member 71 is driven in the X2-direction and the second switching member 72 is driven in the X1-direction. At this time, the horizontal constraining portion 81a of the lock groove 81 and the horizontal constraining portion 82a of the lock groove 82 are separated from the lock pin 42 and the lock member 31a, and the drive chassis 31 is elastically supported in a free state by the damper 25 (the state shown in FIG. 7C). The timing of this lock canceling is indicated at tb2 in FIG. 9.

In this condition, the disc D is rotated, and recording or reproduction is effected by the optical head 35. As shown in FIG. 2, the disc D clamped to the turntable 33 is rotated with a part thereof being positioned inside the magazine M. However, since the disc rotates in front of the recess T1 of the empty tray T, the rotation of the disc is effected in the magazine with vertical margin.

(Operation of Returning Disc to Magazine)

Next, the operation of returning the disc, the driving of which has been completed, in the disc driving section 30 to the magazine M is effected by reversely rotating the motor 50 and continuously rotating the cam gear 53 clockwise. This operation is just the reverse of the operation when the cam gear 53 rotates counterclockwise. In FIG. 9, it is indicated by the operation period Tcw that the cam gear 53 rotates clockwise.

Immediately after the clockwise rotation of the cam gear 53, the first switching member 71 is driven in the X1-direction and the second switching member 72 is driven in the X2-direction by the second switching drive portion 65 of the switching cam 60 shown in FIG. 3, and the procedure advances from the state shown in FIG. 7C to that shown in FIG. 7B, and the lock pin 42 and the lock member 31a provided on the drive chassis 31 are retained by the horizontal constraining portion 81a of the cam groove 81 and the horizontal constraining portion 82a of the cam groove 82, and the disc driving section 30 is locked in the horizontal position (tb3 in FIG. 9).

After this, the switching members 71 and 72 are stopped by the second play portion 64 of the switching cam 60 shown in FIG. 3, and the horizontal lock state (tc3) and the clamp state (te3) of FIG. 7B are maintained, and the slide shaft 58 shown in FIG. 2 is fitted into the second drive constraining portion 57b and the driving section 55 is rotated counterclockwise, and the empty tray T is drawn out in the X1-direction by the hook 24 provided on the transfer member 26. This operation is indicated at ta7.

When the empty tray T reaches the drawn-out position, and the disc D clamped to the turntable 33 is superimposed on the tray T, the tray T stops at the drawn-out position (ta8). While this is happening, the first switching member 71 is driven in the X1-direction and the second switching member 72 is driven in the X2-direction by the first switching drive portion 63 shown in FIG. 3, and the front portion and the rear portion of the drive chassis 31 is lowered by the descent constraining portions 81b and 82b of the cam grooves 81 and 82 (tc4, td4 in FIG. 9). Further, the clamper 38 is raised (te4).

With the disc D being superimposed on the tray T, the clamper 38 is separated from the turntable 33 to attain the clamp cancel state (te5) and, further, the drive chassis 31 is brought into an inclined state (tc5, td5) in which the tray T is directed downward, and, in this condition, the lock of the drive chassis 31 is continued (tb3). After this, the driving member 55 rotates clockwise, and the tray T is transferred to the magazine M by the transfer member 26, and the tray T on which the disc D is placed is returned to the magazine M and restored to the accommodated position (iii) (ta10).

While in the above embodiment the clamper 38 is lowered by the clamp arm 37 and the central portion of the disc D is clamped, it is also possible to adopt an arrangement in which the drive chassis 31 is raised relative to the disc, and, in the condition in which the turntable 33 is fitted into the central hole of the disc, the central hole of the disc is self-clamped without using the damper on the turntable.

As described above, in accordance with the present invention, the rotary member is continuously rotated, and this continuous rotation is converted to reciprocal movement to thereby effect the reciprocal movement between the accommodated position and the drawn-out position. In this way, there is no need to perform control for detecting the tray drawn-out position to stop the motor.

Further, when the above reciprocal movement is effected through continuous rotation in the first rotating direction and the second rotating direction of the rotary member, it is possible to determine the limit and timing of the tray reciprocating movement, so that the control is easily performed.

Further, by utilizing the torque in the first rotating direction and the torque in the second rotating direction of the rotary member, it is possible to control the clamp means and the lock means such that they are separate in their respective rotating directions.

Further, when the tray side portion is constrained from above and below by the hook provided on the tray transfer means, it is possible to prevent the tray from rattling, and there is no need to provide a tray guide member.

As a practitioner of ordinary skill in the art will realize, the present invention is capable of many variations. All such variations to the invention come within the scope of the present invention.

We claim:

1. A disc apparatus to be used with a disc, the disc apparatus comprising:
    a disc driving section, comprising:
        a turntable for rotating a disc, and
        a head for recording information on and/or reproducing information from the rotating disc;
    a tray for carrying a disc;
    tray transferring means for reciprocating the tray between an accommodated position, at which the tray is spaced apart from the turntable, and a drawn-out position, at which the center of a disc carried by the tray is matched with the turntable;
    transfer drive means for reciprocating the tray transferring means; and
    clamp means for clamping the center of a disc to the turntable when the tray is moved from the accommodated position to the drawn-out position, and for canceling the clamping of a disc when the empty tray is moved from the accommodated position to the drawn-out position to enable a disc to return to the accommodated position with the tray,
    wherein the transfer drive means comprises:
        a motor;
        a rotary member rotated by the motor, the rotation occurring continuously in one direction; and
    converting means for converting the rotation in said one direction of the rotary member into a reciprocating movement of said converting means to cause the tray transferring means to reciprocate.

2. A disc apparatus according to claim 1, wherein:
    in the transfer drive means, the rotary member is continuously rotated in a first direction by one of forward rotation and reverse rotation of the motor, and in a second direction opposite to the first direction by the other one of forward rotation and reverse rotation of the motor, and
    the tray transfer means is reciprocated by the converting means during both the continuous rotation of the rotary member in the first direction and the continuous rotation of the rotary member in the second direction.

3. A disc apparatus according to claim 2, wherein, when the rotary member rotates in the first direction and the tray is moved to the drawn-out position by the tray transferring means, the disc center is clamped to the turntable by the clamp means, and when the rotary member rotates in the second direction and the tray is moved to the drawn-out position by the tray transferring means, the clamp of the disc is canceled by the clamp means.

4. A disc apparatus according to claim 3, wherein:
    there is provided an elastic support member elastically supporting the disc driving section, and
    there is provided a lock means which, when the rotary member rotates in the first direction and the tray is moved to the drawn-out position, switches the disc driving section from a lock state to a non-lock state after the disc center is clamped to the turntable by the clamp means, and which, when the rotary member rotates in the second direction and the tray is moved to the drawn-out position, switches the disc driving section from the non-lock state to the lock state when the clamp of the disc is canceled by the clamp means.

5. A disc apparatus according to claim 4 wherein:
    the converting means provided in the transfer drive means is provided with a, play region which allows the rotary member to rotate in the first direction and in the second direction without returning the tray transferring means to the accommodated position when the tray transferring means is moved to the position in which the tray is in the drawn-out position, and
    the clamp means, the lock means, or both the clamp means and the lock means are operated by the rotation drive force of the rotary member in the play region.

6. A disc apparatus according to claim 5, wherein:
    the converting means has a driving member for reciprocating the tray transfer means;
    one of the rotary member and the driving member is provided with a cam;
    the other one of the rotary member and the driving member is provided with a follower sliding on the cam;
    the cam is provided with a drive constraining portion which constrains the follower at the rotation of the rotary member to reciprocate the tray transfer means through the intermediation of the driving member and the play region where the follower slides, and the clamp means or the lock means or both the clamp means and the lock means are driven by the torque of the rotary member when the follower is sliding in the play region.

7. A disc apparatus according to claim 6, wherein there is provided a switching member which is caused to reciprocate by the torque of the rotary member when the follower is sliding in the play region, the switching member operating both the clamp means and the lock means.

8. A disc apparatus according to claim 1, wherein the tray transfer means is provided with a hook which constrains the tray from above and below and which is engaged with the tray so as to allow movement between the accommodated position and the drawn-out position.

9. A disc apparatus according to claim 8, wherein:

in the transfer drive means, the rotary member is continuously rotated in a first direction and a second direction opposite thereto, and the tray transfer means is reciprocated by the converting means during both the continuous rotation in the first direction of the rotary member and the continuous rotation in the second direction of the rotary member.

10. A disc apparatus according to claim 9, wherein:

when the rotary member rotates in the first direction and the tray is moved to the drawn-out position by the tray transferring means, the disc center is clamped to the turntable by the clamp means, and when the rotary member rotates in the second direction and the tray is moved to the drawn-out position by the tray transferring means, the clamp of the disc is canceled by the clamp means.

11. A disc apparatus according to claim 10, wherein:

there is provided an elastic support member elastically supporting the disc driving section, and there is provided a lock means which, when the rotary member rotates in the first direction and the tray is moved to the drawn-out position, switches the disc driving section from a lock state to a non-lock state after the disc center is clamped to the turntable by the clamp means, and which, when the rotary member rotates in the second direction and the tray is moved to the drawn-out position, switches the disc driving section from the non-lock state to the lock state when the clamp of the disc is canceled by the clamp means.

12. A disc apparatus according to claim 10, wherein:

the converting means provided in the transfer drive means is provided with a play region which allows the rotary member to rotate in the first direction and the second direction without returning the tray transferring means in the tray accommodating direction when the tray transferring means is moved to the position in which the tray is in the drawn-out position, and the clamp means, the lock means, or both the clamp means and the lock means are operated by the rotation drive force of the rotary member in the play region.

13. A disc apparatus according to claim 12, wherein:

the converting means has a driving member for reciprocating the tray transfer means;

one of the rotary member and the driving member is provided with a cam;

the other one of the rotary member and the driving member is provided with a follower sliding on the cam;

the cam is provided with a drive constraining portion which constrains the follower at the rotation of the rotary member to reciprocate the tray transfer means through the intermediation of the driving member and the play region where the follower slides; and the clamp means, the lock means, or both the clamp means and the lock means are driven by the torque of the rotary member when the follower is sliding in the play region.

14. A disc apparatus according to claim 1, wherein a plurality of said trays are provided in a magazine so as to be capable of being drawn out and are arranged in a predetermined direction, and the disc driving section and the tray transferring means are moved in said predetermined direction in which the trays are arranged to thereby select the tray to be transferred.

15. A disc apparatus according to claim 14, wherein:

in the transfer drive means, the rotary member is continuously rotated in a first direction and a second direction opposite thereto by forward rotation and reverse rotation of the motor, and the tray transfer means is reciprocated by the converting means during both the continuous rotation in the first direction of the rotary member and continuous rotation in the second direction of the rotary member.

16. A disc apparatus according to claim 15, wherein:

when the rotary member rotates in the first direction and the tray is moved to the drawn-out position by the tray transferring means, the disc center is clamped to the turntable by the clamp means, and when the rotary member rotates in the second direction and the tray is moved to the drawn-out position by the tray transferring means, the clamp of the disc is canceled by the clamp means.

17. A disc apparatus according to claim 16, wherein:

there is provided an elastic support member elastically supporting the disc driving section, and there is provided a lock means which, when the rotary member rotates in the first direction and the tray is moved to the drawn-out position, switches the disc driving section from a lock state to a non-lock state after the disc center is clamped to the turntable by the clamp means, and which, when the rotary member rotates in the second direction and the tray is moved to the drawn-out position, switches the disc driving section from the non-lock state to the lock state when the clamp of the disc is canceled by the clamp means.

18. A disc apparatus according to claim 16, wherein:

the converting means provided in the transfer drive means is provided with a play region which allows the rotary member to rotate in the first direction and the second direction without returning the tray transferring means in the tray accommodating direction when the tray transferring means is moved to the position in which the tray is drawn out, and the clamp means, the lock means, or both the clamp means and the lock means are operated by the rotation drive force of the rotary member in the play region.

19. A disc apparatus according to claim 18, wherein:

the converting means has a driving member for reciprocating the tray transfer means;

one of the rotary member and the driving member is provided with a cam;

the other one of the rotary member and the driving member is provided with a follower sliding on the cam;

the cam is provided with a drive constraining portion which constrains the follower at the rotation of the rotary member to reciprocate the tray transfer means through the intermediation of the driving member and the play region where the follower slides; and the clamp means, the lock means, or both the clamp means and the lock means are driven by the torque of the rotary member when the follower is sliding in the play region.

20. A disc apparatus according to claim 19, wherein there is provided a switching member which is caused to reciprocate by the torque of the rotary member when the follower is sliding in the play region, the switching member operating both the clamp means and the lock means.

* * * * *